(12) United States Patent
Lin et al.

(10) Patent No.: US 12,094,383 B2
(45) Date of Patent: Sep. 17, 2024

(54) DISPLAY DRIVER AND CHARGE RECYCLING METHOD USING THE SAME

(71) Applicant: Novatek Microelectronics Corp., Hsinchu (TW)

(72) Inventors: Chieh-An Lin, Taipei (TW); Keko-Chun Liang, Hsinchu (TW); Jhih-Siou Cheng, New Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/172,291

(22) Filed: Feb. 21, 2023

(65) Prior Publication Data
US 2024/0282231 A1    Aug. 22, 2024

(51) Int. Cl.
*G09G 3/20* (2006.01)
*H02J 7/34* (2006.01)

(52) U.S. Cl.
CPC ............... *G09G 3/20* (2013.01); *H02J 7/345* (2013.01); *G09G 2310/0202* (2013.01); *G09G 2310/0248* (2013.01); *G09G 2310/027* (2013.01); *G09G 2310/0289* (2013.01); *G09G 2310/0291* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 9,196,209 | B2 | 11/2015 | Yen |
| 11,783,765 | B1 * | 10/2023 | Chang ...................... G09G 3/32 345/55 |
| 2006/0232612 | A1 * | 10/2006 | Tsuge ................... G09G 3/3283 345/690 |
| 2012/0032935 | A1 * | 2/2012 | Yen .......................... G09G 3/20 345/204 |
| 2013/0021314 | A1 | 1/2013 | Wu |

(Continued)

FOREIGN PATENT DOCUMENTS

| | | |
|---|---|---|
| TW | 201306004 | 2/2013 |
| TW | 201308296 | 2/2013 |
| TW | 201342336 | 10/2013 |

OTHER PUBLICATIONS

"Office Action of Taiwan Counterpart Application", issued on Mar. 14, 2024, p. 1-p. 4.

*Primary Examiner* — Amr A Awad
*Assistant Examiner* — Donna V Bocar
(74) *Attorney, Agent, or Firm* — JCIPRNET

(57) ABSTRACT

A display driver and a charge recycling method are provided. The display driver includes a charging and discharging circuit and a control circuit. A first terminal of the charging and discharging circuit is coupled to at least one of the scan lines, and a second terminal of the charging and discharging circuit is coupled to at least one of the data lines. The control circuit is coupled to a first control terminal and a second control terminal of the charging and discharging circuit. The charging and discharging circuit receives a first current generated by discharging the at least one of the scan lines to charge the capacitor based on a first control signal. The charging and discharging circuit discharges the capacitor to generate a second current for charging the at least one of the data lines based on a second control signal.

10 Claims, 4 Drawing Sheets

(56) References Cited

U.S. PATENT DOCUMENTS

| | | |
|---|---|---|
| 2013/0038298 A1 | 2/2013 | Yen |
| 2013/0265292 A1 | 10/2013 | Yang et al. |
| 2014/0246989 A1 | 9/2014 | Wu |
| 2016/0260384 A1 | 9/2016 | Kim |
| 2021/0263384 A1* | 8/2021 | Nakamura ........... G09G 3/3674 |

* cited by examiner

DISPLAY DRIVER AND CHARGE RECYCLING METHOD USING THE SAME

BACKGROUND

Technical Field

The disclosure relates to a display driver, and more particularly, relates to a display driver and a charge recycling method.

Description of Related Art

With the development of display technology, display devices, such as liquid crystal display (LCD) and organic light emitting diode (OLED) display have been widely used in notebook computers or tablet computers. However, display panel consumes a lot of power in a display device, especially during the discharging process of each of the scan lines.

Therefore, it would be desirable to reduce the power consumption of a display device, thereby providing a low-power display device.

SUMMARY

The disclosure provides a display driver and a charge recycling method, which can reduce power consumption in a display device.

In an embodiment of the disclosure, a display driver for driving a display panel is provided. The display panel includes a plurality of scan lines and a plurality of data lines. The display driver includes a charging and discharging circuit, a capacitor, and a control circuit. A first terminal of the charging and discharging circuit is coupled to at least one of the plurality of scan lines, and a second terminal of the charging and discharging circuit is coupled to at least one of the plurality of data lines. The control circuit is coupled to a first control terminal and a second control terminal of the charging and discharging circuit.

In an embodiment of the disclosure, a charge recycling method performed by a display driver is provided. The charge recycling method is used for controlling a plurality of scan lines and a plurality of data lines. The display driver is coupled to an external capacitor. The charge recycling method includes: using a first current generated by discharging at least one of the plurality of scan lines to charge the external capacitor based on a first control signal; and using a second current generated by discharging the external capacitor to charge at least one of the plurality of data lines based on a second control signal.

Based on the above, in the embodiments of the disclosure, the display driver receives the discharging current from at least one of the scan lines for charging an external capacitor. When a target data line needs to be charged, the display driver can discharge the external capacitor for charging the target data line. Therefore, the display driver and the charge recycling method of the disclosure can save power dissipated in a display device by perform a charge recycling operation.

To make the aforementioned features more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
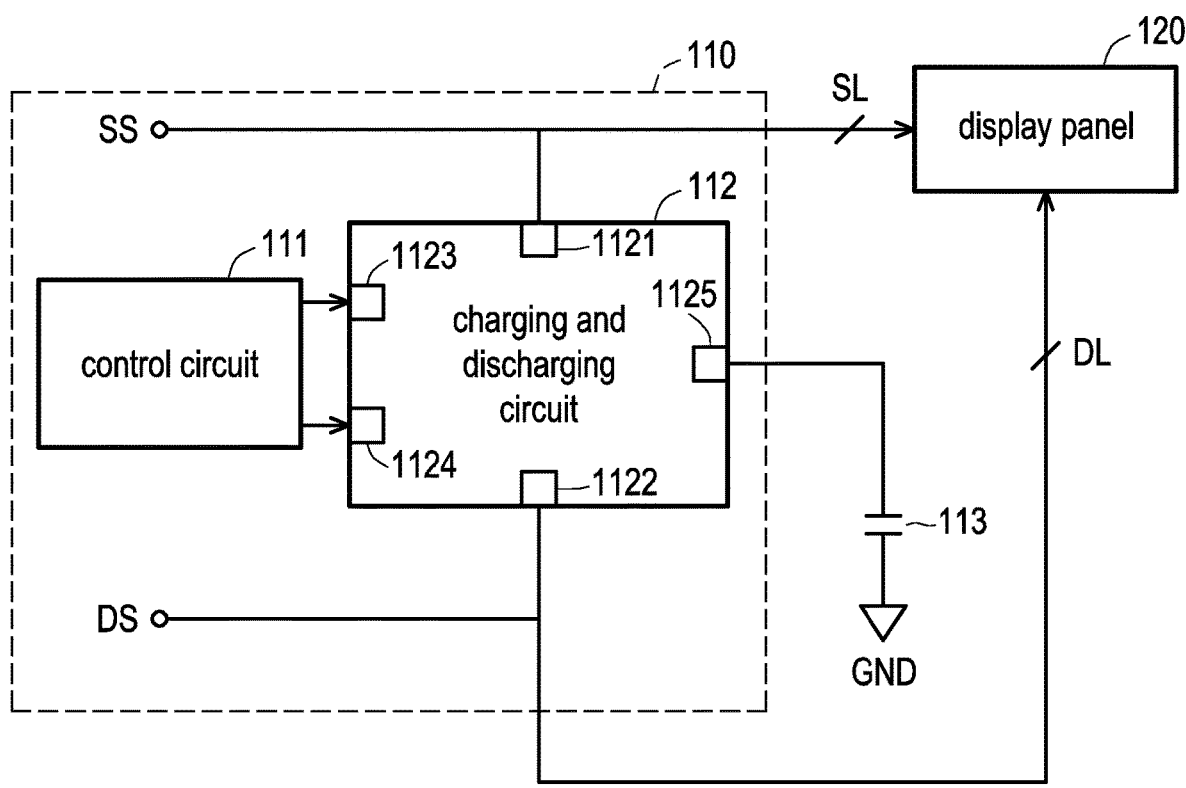
FIG. 1 is a block diagram of a display device according to an embodiment of the disclosure.

The term "couple (or connect)" herein (including the claims) are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Moreover, elements/components/steps with same reference numerals represent same or similar parts in the drawings and embodiments. Elements/components/steps with the same reference numerals or symbols in different embodiments may be mutually referenced to the related description.

FIG. 1 is a block diagram of a display device according to an embodiment of the disclosure Referring to FIG. 1, the display device 100 includes a display driver 110 and a display panel 120. According to the design requirements, in some embodiments, the display panel 120 may be a liquid crystal display (LCD) panel or an organic light emitting diode (OLED) display panel. The display driver 110 may include a gate driver (not shown) to transmit a plurality of scan signals SS to the display panel 120 through a plurality of scan lines SL. In addition, the display driver may include a source driver (not shown). Based on the scan signals SS, the source driver of the display driver 110 may correspondingly generate a plurality of data signals DS, and the source driver of the display driver 110 may transmit the plurality of data signals DS to the display panel 120 through a plurality of data lines DL. Accordingly, the display panel 120 can be driven by the display driver 110 for displaying images.

In the embodiment of FIG. 1, the display driver 110 may include a control circuit 111 and a charging and discharging circuit 112. According to design requirements, the control circuit 111 may be a processor. A first terminal 1121 of the charging and discharging circuit 112 is coupled to at least one of the scan lines SL, and a second terminal 1122 of the charging and discharging circuit 112 is coupled to at least one of the data lines DL. A third terminal 1125 of the charging and discharging circuit 112 is coupled to an external capacitor 113. The control circuit 111 is coupled to a first control terminal 1123 and a second control terminal 1124 of the charging and discharging circuit 112. The charging and discharging circuit 112 is configured to charge the external capacitor 113 by receiving a first current generated by discharging the at least one of the plurality of scan lines SL based on a first control signal of the control circuit 111. The charging and discharging circuit 112 is further configured to discharge the external capacitor 113 to generate a second current for charging the at least one of the plurality of data lines DL based on a second control signal of the control circuit 111.

Figure 2:
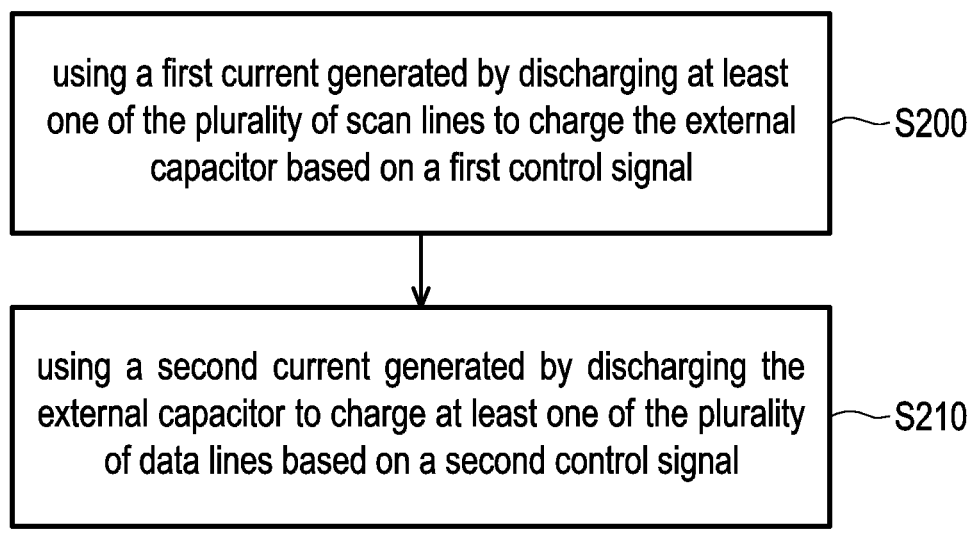
FIG. 2 depicts a flow chart of a charge recycling method according to an embodiment of the disclosure.

For example, FIG. 2 depicts a flow chart of a charge recycling method according to an embodiment of the disclosure. Referring to FIG. 1 and FIG. 2, when at least one of the plurality of scan lines SL starts to be discharged, the control circuit 111 may control the charging and discharging circuit 112 in step S200 to receive a first current generated by discharging the at least one of the plurality of scan lines SL based on a first control signal. Accordingly, the charging and discharging circuit 112 may use the first current to charge the external capacitor 113. In addition, when at least one of the plurality of data line DL need to be charged, the control circuit 111 may control the charging and discharging circuit 112 in step S210 to discharge the external capacitor 113 for generating a second current based on a second control signal. Accordingly, the charging and discharging circuit 112 may use the second current to charge the at least one of the plurality of data lines DL.

Figure 3:
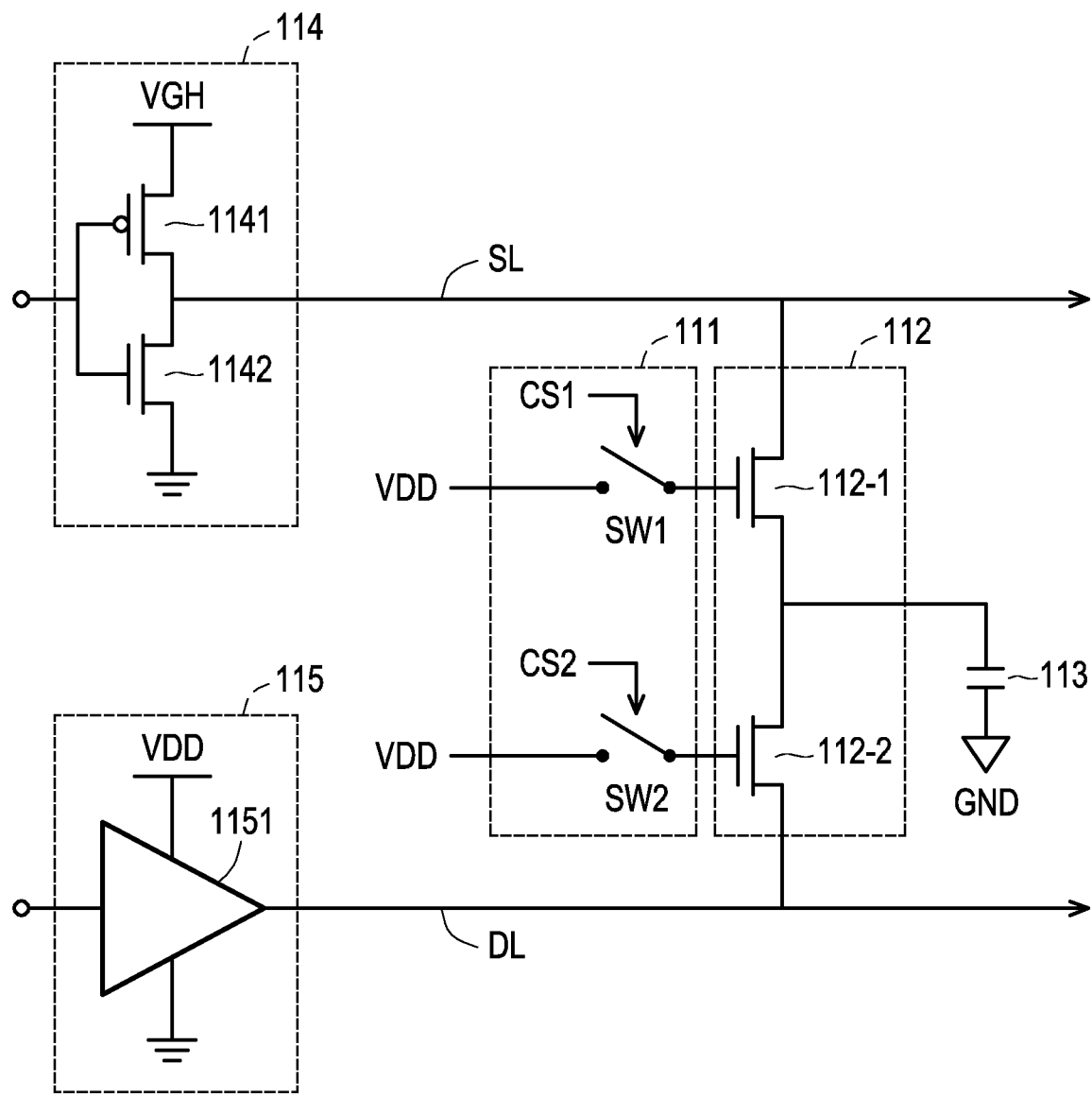
FIG. 3 is a block diagram of the display driver shown in FIG. 1 according to an embodiment of the disclosure.

FIG. 3 is a block diagram of the display driver 110 shown in FIG. 1 according to an embodiment of the disclosure. Referring to FIG. 3, the display driver 110 may include a level shifter 114 (i.e. a gate driver) and an output buffer 115. The level shifter 114 includes an output inverter which has an output terminal coupled to a scan line SL. The output inverter includes a transistor 1141 and a transistor 1142. A first terminal of the transistor 1141 is couple to a high voltage VGH which may have a voltage value from 16 volt to 32 volt. A second terminal of the transistor 1141 is coupled to the scan line SL. A first terminal of the transistor 1142 is coupled to the second terminal of the transistor 1141. A second terminal of the transistor 1142 is coupled to ground. The output buffer 115 may include an operational amplifier 1151 which has an output terminal coupled to a data line DL. A first power terminal of the operational amplifier 1151 is coupled to a first voltage VDD which may have a voltage value lower than 10 volt. A second power terminal of the operational amplifier 1151 is coupled to ground.

Referring to FIG. 3, the charging and discharging circuit 112 includes a first transistor 112-1 and a second transistor 112-2. A first terminal of the first transistor 112-1 is coupled to a scan line SL, and a second terminal of the first transistor 112-1 is coupled to the external capacitor 113. A first terminal of the second transistor 112-2 is coupled to the second terminal of the first transistor 112-1, and a second terminal of the second transistor 112-2 is coupled to a data line DL. The control circuit 111 includes a first switch SW1 and a second switch SW2. A first terminal of the first switch SW1 is coupled to a first voltage VDD, a second terminal of the first switch SW1 is coupled to a control terminal of the first transistor 112-1, and a control terminal of the first switch SW1 is coupled to a first control signal CS1. A first terminal of the second switch SW2 is coupled to the first voltage VDD, a second terminal of the second switch SW2 is coupled to a control terminal of the second transistor 112-2, and a control terminal of the second switch SW2 is coupled to a second control signal CS2. In some embodiments, the first control signal CS1 and the second control signal CS2. may be generated by the control circuit 111. In another embodiment, the first control signal CS1 and the second control signal CS2. may be generated by a timing controller (not shown) coupled to the control circuit 111.

It should be noted that the first switch SW1 and the second switch SW2 in FIG. 3 are preset in a turn-off state. When the scan line SL in FIG. 3 starts to be discharged, only the first switch SW1 will be turned on by the control circuit 111 based on the first control signal CS1. If a voltage difference between the gate voltage (i.e. VDD) of the first transistor 112-1 and the voltage on the external capacitor 113 is higher than a threshold voltage (i.e. Vth) of the first transistor 112-1, the first transistor 112-1 will be in a conducting state. Therefore, a discharging current coming from the scan line SL flows to the external capacitor 113 via the first transistor 1121. When the voltage on the capacitor 113 is close to the first voltage VDD, the first transistor 112-1 will be in a cut-off state, which prevents non-limited charging to the external capacitor 113. When the data line DL in FIG. 3 needs to be charged, only the second switch SW2 will be turned on by the control circuit 111 based on the second control signal CS2. Therefore, the second transistor 112-2 will be in a conducting state, and a charging current coming from the external capacitor 113 flows to the data line DL via the second transistor 112-2.

Figure 4:
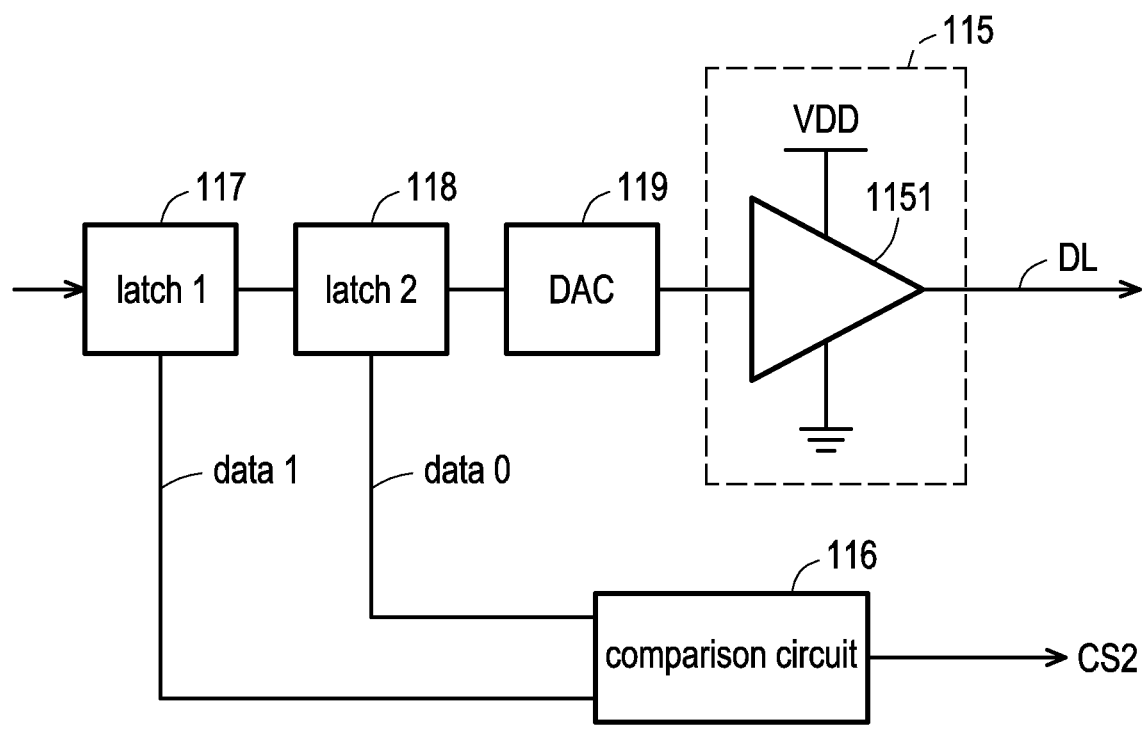
FIG. 4 depicts a comparison operation between a previous data and a current data according to an embodiment of the disclosure.

In some embodiments, the second control signal CS2 in FIG. 3 may be generated based on a comparison operation between a previous data and a current data. For example, FIG. 4 depicts a comparison operation between a previous data and a current data according to an embodiment of the disclosure. Referring to FIG. 4 and FIG. 3, the display driver 110 may further include a comparison circuit 116, a first latch 117, a second latch 118, and a digital-to-analog converter (DAC) 119. The first latch 117 may store a current data (i.e. data 1). The second latch 118 is coupled to the first latch 117. The second latch 118 may store a previous data (i.e. data 0). The current data (i.e. data 1) and the previous data (i.e. data 0) may be data voltages setting value associated with the data line DL. The DAC 119 is coupled between the second latch 118 and the output buffer 115 of the display driver 110. The DAC 119 may output an analog voltage based on the previous data (i.e. data 0) stored in the second latch 118.

Referring to FIG. 4, the first latch 117 and the second latch 118 may respectively output the current data (i.e. data 1) and the previous data (i.e. data 0) to the comparison circuit 116. The comparison circuit 116 may compare the previous data (i.e. data 0) with the current data (i.e. data 1) to generate the second control signal CS2. For example, the comparison circuit 116 may determine whether a relationship between the previous data (i.e. data 0) and the current data (i.e. data 1) meets a charging requirement of the data line DL. If a difference between the previous data (i.e. data 0) and the current data (i.e. data 1) is larger than a preset value, the comparison circuit 116 may determine that the data line DL needs to be charged. Therefore, the comparison circuit 116 may output the second control signal CS2 having a high logic level to the control circuit 111, and the control circuit 111 may turn on the second switch SW2 for conducting a charging path of the data line DL.

On the other hand, if a difference between the previous data (i.e. data 0) and the current data (i.e. data 1) is smaller than the preset value, the comparison circuit 116 may determine that the data line DL does not need to be charged. Therefore, the comparison circuit 116 may output the second control signal CS2 having a low logic level to the control circuit 111, and the control circuit 111 may keep the second switch SW2 in a turn-off state.

In summary, in the embodiments of the disclosure, the display driver receives the discharging current from at least one of the scan lines for charging an external capacitor. When a target data line needs to be charged, the display driver can discharge the external capacitor for charging the target data line. Therefore, the display driver and the charge recycling method of the disclosure can save power dissipated in a display device by perform a charge recycling operation.

Although the disclosure has been disclosed by the above embodiments, they are not intended to limit the disclosure. It will be apparent to one of ordinary skill in the art that modifications and variations to the disclosure may be made without departing from the spirit and scope of the disclosure. Therefore, the scope of the disclosure will be defined by the appended claims.

What is claimed is:

1. A display driver for driving a display panel which comprises a plurality of scan lines and a plurality of data lines, the display driver comprising:
   a charging and discharging circuit, wherein a first terminal of the charging and discharging circuit is coupled to at least one of the plurality of scan lines, and a second terminal of the charging and discharging circuit is coupled to at least one of the plurality of data lines; and
   a control circuit, coupled to a first control terminal and a second control terminal of the charging and discharging circuit,
   wherein the charging and discharging circuit comprises:
      a first transistor, wherein a first terminal of the first transistor is coupled to the at least one of the plurality of scan lines, a second terminal of the first transistor is coupled to an external capacitor, and a control terminal of the first transistor serves as the first control terminal of the charging and discharging circuit; and
      a second transistor, wherein a first terminal of the second transistor is coupled to the second terminal of the first transistor, a second terminal of the second transistor is coupled to the at least one of the plurality of data lines, and a control terminal of the second transistor serves as the second control terminal of the charging and discharging circuit;
   wherein a third terminal of the charging and discharging circuit is coupled to the external capacitor,
   wherein the charging and discharging circuit is configured to change the external capacitor by receiving a first current generated by discharging the at least one of the plurality of scan lines based on a first control signal of the control circuit,
   wherein the charging and discharging circuit is configured to discharge the external capacitor to generate a second current for charging the at least one of the plurality of data lines based on a second control signal of the control circuit.

2. The display driver according to claim 1, wherein the control circuit comprises:
   a first switch, wherein a first terminal of the first switch is coupled to a first voltage, a second terminal of the first switch is coupled to the control terminal of the first transistor, and a control terminal of the first switch is coupled to the first control signal; and
   a second switch, wherein a first terminal of the second switch is coupled to the first voltage, a second terminal of the second switch is coupled to the control terminal of the second transistor, and a control terminal of the second switch is coupled to the second control signal.

3. The display driver according to claim 2, wherein when the first switch is turned on, the charging and discharging circuit is configured to charge the external capacitor; and
   when the second switch is turned on, the charging and discharging circuit is configured to discharge the external capacitor.

4. The display driver according to claim 3, further comprising:
   a comparison circuit, coupled to the control circuit, wherein the comparison circuit is configured to compare a previous data with a current data to generate the second control signal, and the control circuit uses the second control signal to control the second switch.

5. The display driver according to claim 4, further comprising:
   a first latch, coupled to the comparison circuit, wherein the first latch is configured to provide the current data to the comparison circuit;
   a second latch, coupled to the first latch and the comparison circuit, wherein the second latch is configured to provide the previous data to the comparison circuit; and
   a digital-to-analog converter, coupled between the second latch and an output buffer of the display driver.

6. The display driver according to claim 1, further comprising:
   a level shifter, coupled to the charging and discharging circuit through the at least one of the plurality of scan lines, wherein the level shifter includes an output inverter to output a scan signal.

7. The display driver according to claim 1, further comprising:
   an output buffer, coupled to the charging and discharging circuit through the at least one of the plurality of data lines, wherein the output buffer is configured to output a data signal.

8. A charge recycling method, performed by a display driver to control a plurality of scan lines and a plurality of data lines, wherein the display driver is coupled to an external capacitor, the charge recycling method comprising:
   using a first current generated by discharging at least one of the plurality of scan lines to charge the external capacitor based on a first control signal; and
   using a second current generated by discharging the external capacitor to charge at least one of the plurality of data lines based on a second control signal,
   wherein the display driver comprises a charging and discharging circuit, and the charging and discharging circuit comprises:
      a first transistor, wherein a first terminal of the first transistor is coupled to the at least one of the plurality of scan lines, a second terminal of the first transistor is coupled to the external capacitor, and a control terminal of the first transistor serves as a first control terminal of the charging and discharging circuit; and
      a second transistor, wherein a first terminal of the second transistor is coupled to the second terminal of the first transistor, a second terminal of the second transistor is coupled to the at least one of the plurality of data lines, and a control terminal of the second transistor serves as a second control terminal of the charging and discharging circuit.

9. The charge recycling method according to claim 8, further comprising:
   in response to the at least one of the plurality of scan lines starts to be discharged, generating the first control signal by a control circuit to charge the external capacitor.

10. The charge recycling method according to claim 8, further comprising:

comparing a previous data with a current data to generate the second control signal by a comparison circuit; and using the second control signal to control a conducting state of a charging path for the at least one of the plurality of data lines.

* * * * *